(12) United States Patent
Nishiyama et al.

(10) Patent No.: US 11,354,095 B2
(45) Date of Patent: Jun. 7, 2022

(54) VEHICULAR ARITHMETIC OPERATION PROCESSING DEVICE, SERVER COMPUTER, AND NON-TRANSITORY STORAGE MEDIUM

(71) Applicant: Toyota Jidosha Kabushiki Kaisha, Toyota (JP)

(72) Inventors: Masahiro Nishiyama, Toyota (JP); Kenji Tsukagishi, Toyota (JP); Takahisa Kaneko, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/019,521

(22) Filed: Sep. 14, 2020

(65) Prior Publication Data
US 2021/0103428 A1    Apr. 8, 2021

(30) Foreign Application Priority Data

Oct. 3, 2019    (JP) .............................. JP2019-182779

(51) Int. Cl.
G06F 7/48    (2006.01)
(52) U.S. Cl.
CPC ...................... G06F 7/48 (2013.01)
(58) Field of Classification Search
CPC ....................................................... G06F 7/48
See application file for complete search history.

(56) References Cited

U.S. PATENT DOCUMENTS

| 2015/0207859 A1* | 7/2015 | Lu ........................... H04L 67/12 709/202 |
| 2019/0121661 A1 | 4/2019 | Kanada |
| 2020/0019445 A1* | 1/2020 | Altintas ................ G06F 9/5011 |
| 2020/0160722 A1* | 5/2020 | Brugman ................ H04W 4/46 |

FOREIGN PATENT DOCUMENTS

| JP | 2017-228107 A | 12/2017 |
| JP | 2019-079137 A | 5/2019 |
| JP | 2019-101641 A | 6/2019 |

* cited by examiner

*Primary Examiner* — Chuong D Ngo
(74) *Attorney, Agent, or Firm* — Dinsmore & Shohl LLP

(57) ABSTRACT

A vehicular arithmetic operation processing device that is mounted in a vehicle having a communication function of communicating with an outside of the vehicle and the vehicular arithmetic operation processing device includes an electronic control unit. The electronic control unit is configured to: perform an arithmetic operation for an arithmetic operation task, output a result of the arithmetic operation, and receive an arithmetic operation task from the outside of the vehicle by using the communication function when an amount of arithmetic operations performed in the vehicular arithmetic operation processing device is equal to or less than a predetermined first value; and transmit an arithmetic operation task to the outside of the vehicle by using the communication function when the amount of arithmetic operations which are performed in the vehicular arithmetic operation processing device is equal to or greater than a predetermined second value.

7 Claims, 3 Drawing Sheets

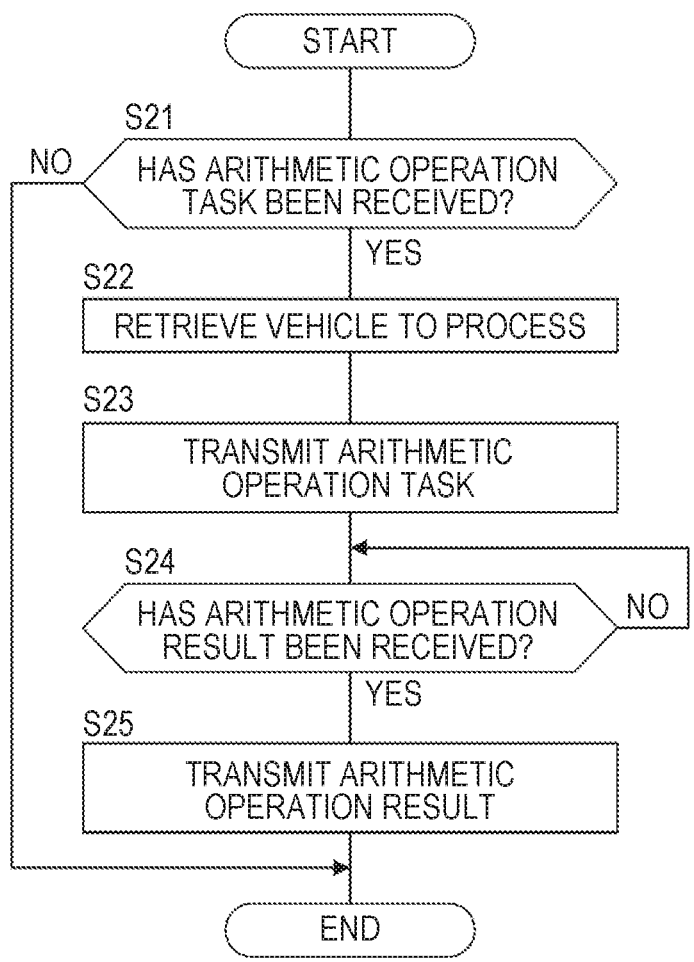

VEHICULAR ARITHMETIC OPERATION PROCESSING DEVICE, SERVER COMPUTER, AND NON-TRANSITORY STORAGE MEDIUM

CROSS REFERENCE TO RELATED APPLICATION

This application claims priority to Japanese Patent Application No. 2019-182779 filed on Oct. 3, 2019, the content of which is incorporated herein by reference in its entirety.

BACKGROUND

1. Technical Field

The disclosure relates to a vehicular arithmetic operation processing device, a server computer, and a non-transitory storage medium.

2. Description of Related Art

With advances in information communication technology, many processes in a vehicle are now being performed by a computer (an arithmetic operation processing device). In automated driving or the like, since steering or the like is controlled in consideration of surrounding conditions or the like, an amount of arithmetic operations is great and an amount of communication with the outside in communication with surrounding infrastructure such as beacons and a server computer of a traffic management system is also increasing.

Accordingly, an amount of arithmetic operations in an arithmetic operation processing device which is mounted in a vehicle varies greatly depending on conditions at that time. An amount of arithmetic operations in a server computer also varies from moment to moment.

In Japanese Unexamined Patent Publication No. 2019-079137 (JP 2019-079137 A), when an arithmetic operation processing device which is mounted in a vehicle has a large surplus arithmetic capacity, the arithmetic operation processing device is programmed to carry out an arithmetic operation task which is supplied from an external server computer. Accordingly, it is possible to effectively use an arithmetic capacity of the arithmetic operation processing device of the vehicle.

SUMMARY

A load in arithmetic operations such as automated driving of a vehicle has increased and effective use of such an arithmetic operation processing device has become more necessary.

The disclosure provides a technique of more effectively using an arithmetic operation processing device by equalizing an arithmetic operation in a vehicle.

According to a first aspect of the disclosure, there is provided a vehicular arithmetic operation processing device which is mounted in a vehicle having a communication function of communicating with an outside of the vehicle. The vehicular arithmetic operation processing device includes an electronic control unit and the electronic control unit is configured to perform an arithmetic operation for an arithmetic operation task, to output a result of the arithmetic operation, and to receive an arithmetic operation task from the outside of the vehicle by using the communication function when an amount of arithmetic operations performed in the vehicular arithmetic operation processing device is equal to or less than a predetermined first value. The electronic control unit is configured to transmit an arithmetic operation task to the outside of the vehicle by using the communication function when the amount of arithmetic operations which are performed in the vehicular arithmetic operation processing device is equal to or greater than a predetermined second value.

In the first aspect, the electronic control unit may be configured to receive an arithmetic operation task from the outside of the vehicle via an external server computer.

In the first aspect, the electronic control unit may be configured to transmit an arithmetic operation task to the outside of the vehicle via an external server computer.

In the first aspect, the communication function of communicating with the outside of the vehicle may include a communication function of communicating with an arithmetic operation processing device of another vehicle located in a predetermined range.

In the first aspect, the electronic control unit may be configured to transmit an arithmetic operation task to the vehicular arithmetic operation processing device of the other vehicle located in the predetermined range by using the communication function when the amount of arithmetic operations performed in the vehicular arithmetic operation processing device is equal to or greater than the predetermined second value.

In the first aspect, the predetermined first value and the predetermined second value may be the same.

According to a second aspect of the disclosure, there is provided a server computer. The server computer includes a transmitter configured to communicate with a plurality of vehicles and a control unit. The controller is configured to retrieve a second vehicle that is able to perform an arithmetic operation for an arithmetic operation task from the plurality of vehicles when the arithmetic operation task is received from a first vehicle out of the plurality of vehicles via the transmitter and to transmit the arithmetic operation task to the second vehicle via the transmitter.

According to a third aspect of the disclosure, there is provided a non-transitory storage medium storing instructions that are executable by one or more processors which are mounted in a vehicle having a communication function of communicating with an outside of the vehicle, and the instructions that cause the one or more processors to perform functions. The functions include a function of performing an arithmetic operation for an arithmetic operation task and outputting a result of the arithmetic operation and a function of receiving an arithmetic operation task from the outside of the vehicle when an amount of arithmetic operations is equal to or less than a predetermined first value and transmitting an arithmetic operation task to the outside of the vehicle when the amount of arithmetic operations is equal to or greater than a predetermined second value.

According to the first aspect, the second aspect, and the third aspect of the disclosure, since an arithmetic operation task is transmitted to and received from the outside by determining whether there an amount of arithmetic operations in the arithmetic operation processing device is not at full capacity, it is possible to equalize arithmetic operations as a whole and to effectively use arithmetic operation processing resources.

BRIEF DESCRIPTION OF THE DRAWINGS

Features, advantages, and technical and industrial significance of exemplary embodiments of the disclosure will be

FIG. 4 is a flowchart illustrating an arithmetic operation task which is performed in a server computer.

DETAILED DESCRIPTION

Hereinafter, an embodiment of the disclosure will be described with reference to the accompanying drawings. The disclosure is not limited to the embodiment described below.

Overall Configuration

Figure 1:
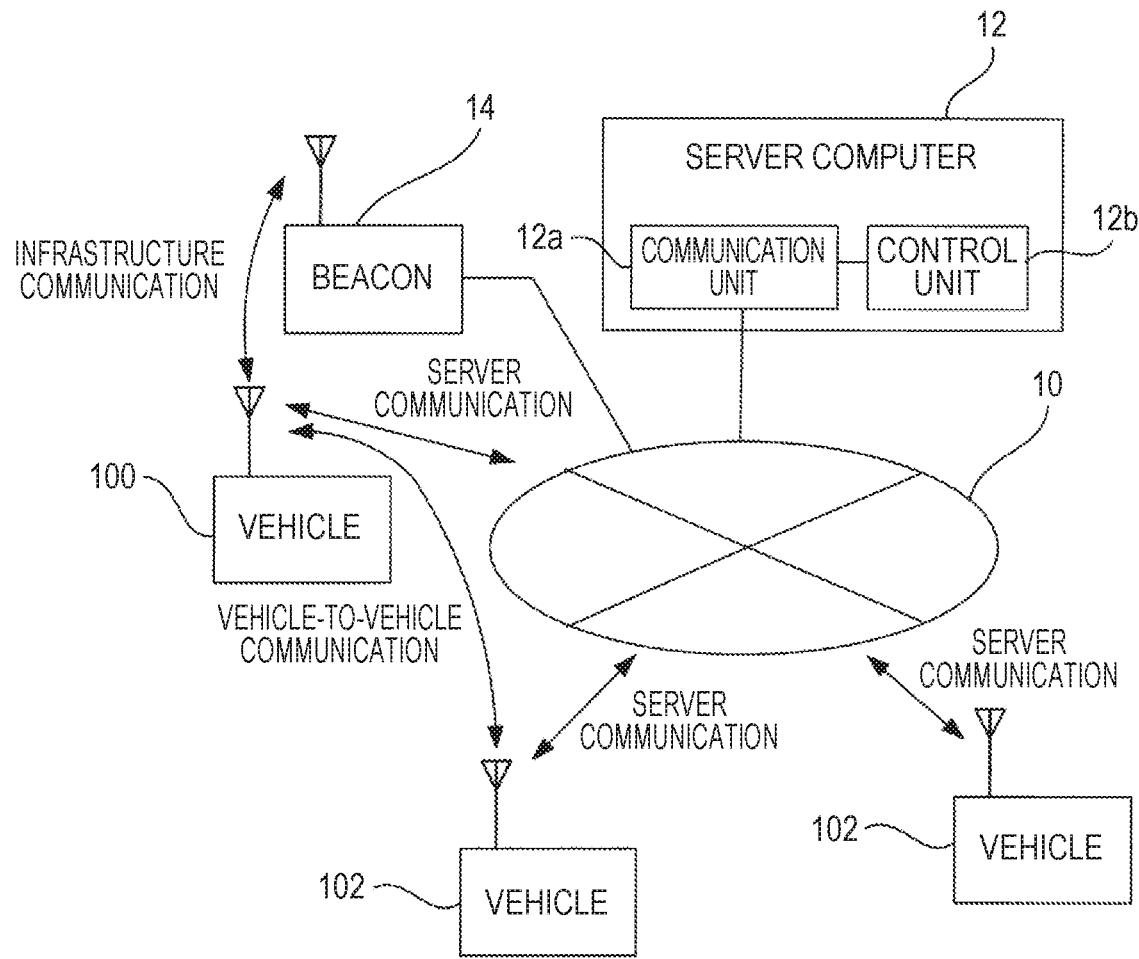
FIG. 1 is a diagram illustrating an overall configuration of a communication system including a vehicle.

FIG. 1 is a diagram illustrating an overall configuration of a communication system including vehicles 100 and 102. A server computer 12 is connected to a communication network 10 including the Internet. The server computer 12 is a computer including a central processing unit (CPU), a read only memory (ROM), a random access memory (RAM), a hard disk drive (HDD), and a removable medium, and includes a communication unit 12a that performs communication using a communication network 10 and a control unit 12b that controls the overall device as functional blocks. The ROM, the RAM, the HDD, and the removable medium are computer-readable storage mediums. For example, the CPU may load a program stored in the HDD to a work area of the RAM and execute the program, and may perform a control process and a communication process by executing the program. In this example, the server computer 12 is a system that manages movement of vehicles 100 in a predetermined region such as a traffic management center, and provides various types of services such as searching for a route and providing congestion information or automated driving resource information. A plurality of server computers 12 may be provided depending on roles thereof such as providing individual services, comprehensively controlling the individual services, and providing other information such as weather.

A beacon 14 is connected to the communication network 10. The beacon 14 is provided in a crossing or the like, supplies a vehicle 100 with information necessary for the crossing which is provided from the server computer 12, and supplies the server computer 12 with information of the vehicle 100 passing through the crossing. The beacon 14 may supply the vehicle 100 with information which is independently stored therein. A premise of the beacon 14 is that a plurality of beacons is disposed at a plurality of crossings.

The vehicles 100 and 102 are vehicles with a communication function which travel on a road. Appropriately, the vehicle 100 is referred to as a host vehicle 100 and the vehicle 102 is referred to as another vehicle 102.

The vehicle 100 can perform radio communication with a base station of the communication network 10 and thus perform server communication with the server computer 12. The vehicle 100 can perform infrastructure communication with the beacon 14 and vehicle-to-vehicle communication with the other vehicle 102.

Vehicle

Figure 2:
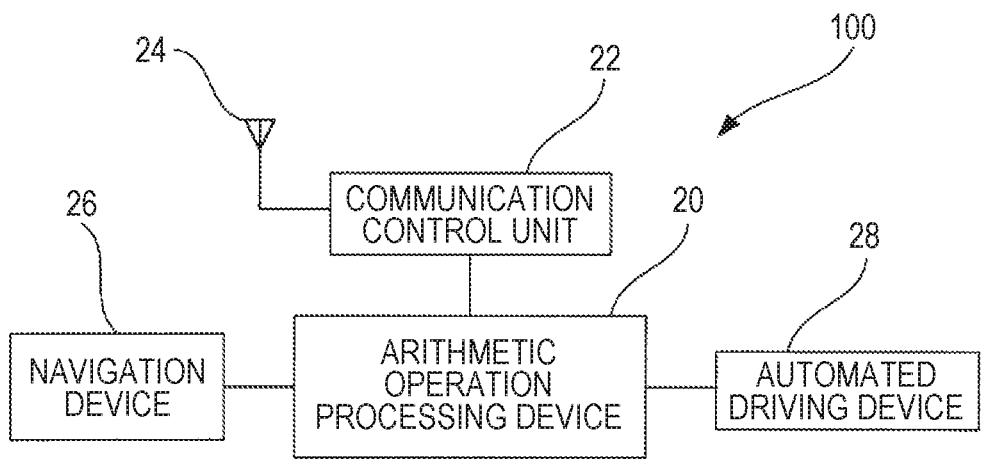
FIG. 2 is a diagram illustrating a configuration in which an arithmetic operation and a communication process are performed in a vehicle.

FIG. 2 is a diagram illustrating a configuration for performing an arithmetic operation and a communication process, which is mounted in the vehicles 100 and 102. An arithmetic operation processing device 20 includes an electronic circuit that can perform an arithmetic operation, performs various types of arithmetic operations, and outputs arithmetic operation results. The arithmetic operation processing device 20 is a computer including a central processing unit (CPU), a read only memory (ROM), a random access memory (RAM), a hard disk drive (HDD), and a removable medium. The computer is, for example, an electronic control unit. The ROM, the RAM, the HDD, and the removable medium are computer-readable storage mediums. For example, the CPU may load a program stored in the HDD to a work area of the RAM and execute the program, and may perform an arithmetic operation and a communication process by executing the program.

The arithmetic operation processing device 20 is connected to a communication control unit 22 and controls communication with the outside of the vehicle (server communication, infrastructure communication, or vehicle-to-vehicle communication). The communication control unit 22 is connected to an antenna 24 and transmits and receives radio waves using the antenna 24. The arithmetic operation processing device 20 is connected to a navigation device 26 that performs route guidance or the like and an automated driving device 28 that controls automated driving. The arithmetic operation processing device 20 may perform various types of processes necessary for a vehicle such as an audio process and may be physically distributed to a plurality of arithmetic operation processing devices.

Process Flow

Figure 3:
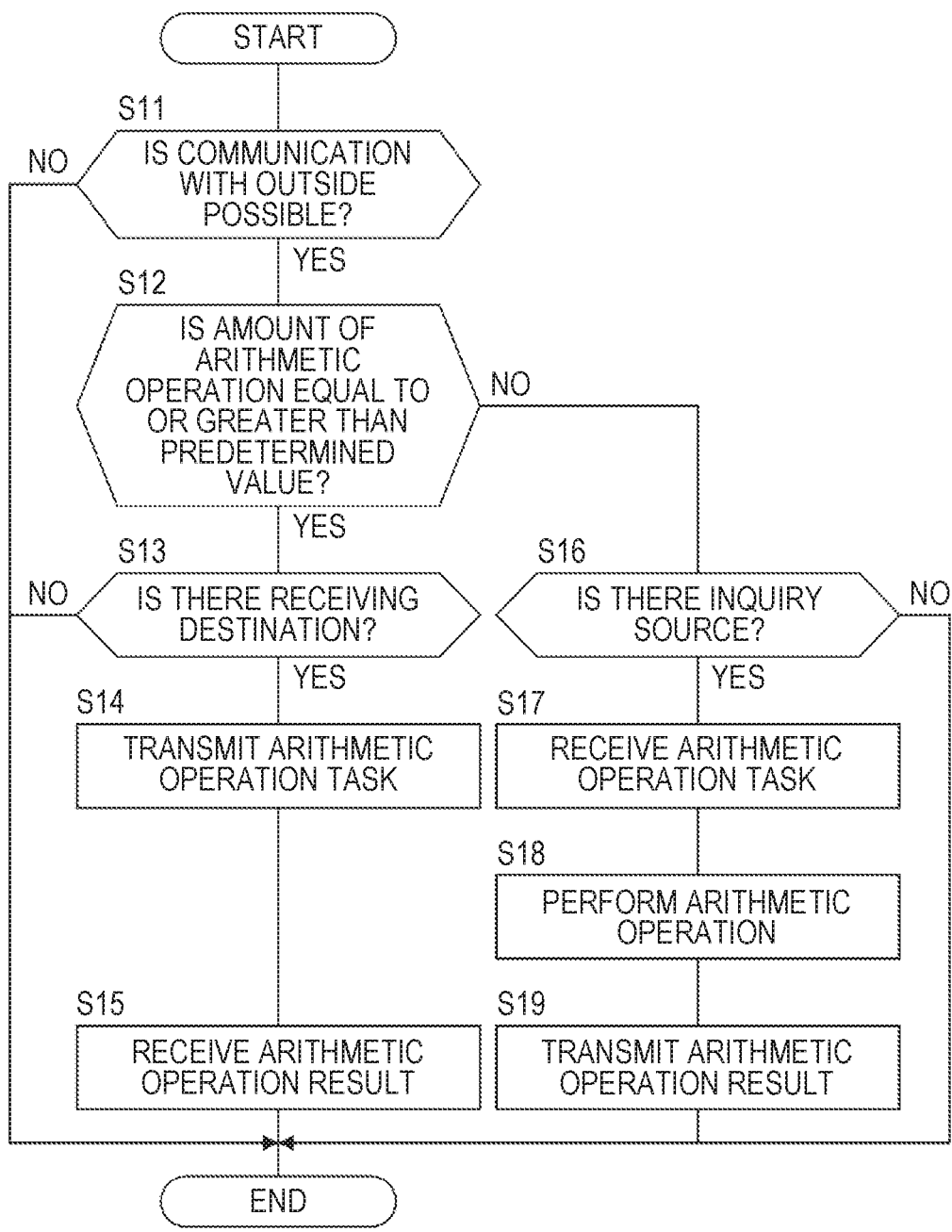
FIG. 3 is a flowchart illustrating an arithmetic operation which is shared by the outside in an arithmetic operation processing device.

FIG. 3 is a flowchart illustrating a process flow of arithmetic operations which are shared by the outside in the arithmetic operation processing device 20. First, it is determined whether communication with the outside is possible (S11). Communication with the outside is normally possible and communication may not be possible due to malfunction of a device, a network failure, or the like. When the determination result of S11 is NO and communication with the outside is not possible, an arithmetic operation cannot be shared by the outside and thus the process flow ends.

When the determination result of S11 is YES, it is determined whether an amount of arithmetic operations in the arithmetic operation processing device 20 is equal to or greater than a predetermined value (S12). That is, it is determined whether the arithmetic operation processing device 20 is at full capacity. When the determination result of S12 is YES, the arithmetic operation processing device 20 is at full capacity, and it is preferable to receive help from an outside arithmetic operation processing device. Therefore, an inquiry about whether an arithmetic operation can be undertaken by an external device, that is, whether there is a receiving destination, is transmitted by communication (S13). This includes an inquiry about whether the server computer 12 can undertake the arithmetic operation by server communication, an inquiry about whether the other vehicle 102 can undertake the arithmetic operation by vehicle-to-vehicle communication, and an inquiry about whether the other vehicle 102 can undertake the arithmetic operation via the server computer 12. That is, the vehicle-to-vehicle communication is targeted to the other vehicle 102 which is located in a predetermined range in which direct communication is possible, but may be targeted to all other vehicles 102 connected to the communication network 10 when the communication is performed via the server computer 12.

When the response to the inquiry of S13 is NO, there is no device that can undertake the arithmetic operation and thus the process flow ends. When a receiving destination is searched for via the server computer 12, generally, some receiving destinations are found. When a plurality of receiving destinations is found, an appropriate receiving destination can be determined by the server computer 12.

In this embodiment, a receiving destination in vehicle-to-vehicle communication has priority. Accordingly, a load of the server computer 12 or the communication network 10 does not cause a problem and an arithmetic operation can be more effectively shared. When vehicle-to-vehicle communication is targeted to the other vehicle 102 located in a predetermined range and a shared arithmetic operation in the other vehicle ends, the vehicle-to-vehicle communication may not be possible. In order to cope with this case, an address of the host vehicle can be supplied via the communication network 10 at the time of an inquiry about the arithmetic operation.

When the determination result of S13 is YES, an arithmetic operation task is transmitted to the corresponding receiving destination (S14). Accordingly, an arithmetic operation task is transmitted to the receiving destination and an arithmetic operation is performed at the receiving destination. When an arithmetic operation result is acquired at the receiving destination, the arithmetic operation result is transmitted therefrom and the arithmetic operation result is received (S15).

In this way, when at full capacity, the arithmetic operation processing device 20 of the host vehicle 100 can perform an arithmetic operation for the arithmetic operation task using an external arithmetic operation function and receive the arithmetic operation result. Accordingly, in comparison with a case in which the arithmetic operation is performed in the host vehicle 100, it is possible to increase a probability that a result will be obtained earlier and to perform an arithmetic operation with higher priority in the host vehicle 100. Particularly, it is possible to perform an arithmetic operation using an arithmetic operation processing device that is not at full capacity, to equalize an arithmetic operation, and to effectively utilize an arithmetic capacity.

When the determination result of S12 is NO, the arithmetic operation processing device 20 of the host vehicle 100 has capacity for an arithmetic operation. In this case, it is determined whether there is an inquiry source by communication (S16). This determination of whether there is an inquiry source is also performed by vehicle-to-vehicle communication in addition to server communication.

When the determination result is NO, there is no inquiry from the outside and thus the process flow ends. On the other hand, when the determination result of S16 is YES, an arithmetic operation task from an inquiry source is received (S17). Here, when there is a plurality of inquiries, priority can be given to an inquiry with high urgency from an emergency vehicle such as an ambulance. Processes such as searching for a transportation destination and acquiring information on acceptance of a destination hospital can be performed on behalf of an emergency vehicle.

Then, an arithmetic operation for the received arithmetic operation task is performed (S18) and the arithmetic operation result is transmitted to the inquiry source (S19).

In this way, when there is spare arithmetic capacity in the host vehicle 100, an inquiry from another vehicle 102 or the like is received and an arithmetic operation is performed. Accordingly, it is possible to effectively use resources of the host vehicle 100.

In S12, whether the amount of arithmetic operations is equal to or greater than a predetermined value is determined using the same threshold value, but different threshold values (a predetermined first value and a predetermined second value) may be used as the threshold value, the threshold value (the predetermined first value) for transmitting an inquiry to the outside (transmitting an arithmetic operation task to the outside) may be set to be high, and the threshold value (the predetermined second value) for receiving an inquiry from an external inquiry source (receiving an arithmetic operation task from the outside) may be set to be low. Accordingly, when the amount of arithmetic operations is in a certain range, an arithmetic operation can be performed in only the host vehicle 100 and thus extra communication with the outside can be omitted. The processes of S13 and S16 may be normally performed regardless of determination of the amount of arithmetic operations in S12, and a list of candidates may be prepared. Accordingly, at the time of determination of S13 and S16, it is possible to select a partner from the candidates in the list and to contact the selected partner. When the order of the list is determined in consideration of priority, it is possible to easily select an appropriate communication partner by determining the partner in the list.

In a vehicle having an automated driving function, an arithmetic capacity of the arithmetic operation processing device 20 is normally great. Accordingly, when automated driving is not performed, there is spare arithmetic capacity and the determination result of S12 is often NO. Regardless of an automated driving function, the amount of arithmetic operations is not at full capacity in a parked state or the like.

In an automated-driving vehicle, an arithmetic operation for automated driving of the host vehicle has high immediacy and is not easy to inquire of the outside about. Therefore, an arithmetic operation task with low immediacy can be inquired of the outside. For example, low priority can be given to retrieving a route, retrieving other information, processing audio, or the like.

In this way, according to this embodiment, it is also possible to transmit and receive an arithmetic operation task using vehicle-to-vehicle communication. Accordingly, in comparison with a case in which only communication via the server computer 12 is performed, it is possible to more efficiently equalize an arithmetic operation and to achieve effective use of resources.

Transmission and reception of an arithmetic operation task with the infrastructure such as the beacon 14 may be performed as in the vehicles 100 and 102 and the like.

Process in Server Computer

FIG. 4 is a flowchart illustrating a process flow of processing an arithmetic operation task in the server computer 12. By monitoring whether an arithmetic operation task for an arithmetic operation has been transmitted from one vehicle (a first vehicle) 100 of a plurality of vehicles, it is determined whether an arithmetic operation task has been received (S21). When an arithmetic operation task has been received, a vehicle 102 that can process the arithmetic operation task (perform an arithmetic operation for the arithmetic operation task) is searched for (S22). Then, the arithmetic operation task is transmitted to a vehicle (a second vehicle) 102 acquired as the result of search (S23). The vehicle (second vehicle) 102 having received the arithmetic operation task performs an arithmetic operation for the arithmetic operation task and transmits the result of the arithmetic operation to the server computer 12. When the result of the arithmetic operation has been received (YES in S24), the server computer 12 transmits the result of the arithmetic operation to the vehicle (first vehicle) 100 (S25). In this way, when an arithmetic operation in a vehicle (first vehicle) is delayed, a result of the arithmetic operation can be acquired by transmitting an arithmetic operation task to the server computer 12. Particularly, by causing a vehicle (second vehicle) 102 with spare arithmetic capacity to perform an arithmetic operation without causing the server computer 12 to perform the arithmetic operation, it is possible to effectively use the arithmetic capacity of a plurality of vehicles 100 and 102.

What is claimed is:

1. A vehicular arithmetic operation processing device that is mounted in a vehicle having a communication function of communicating with an outside of the vehicle, the vehicular arithmetic operation processing device comprising an electronic control unit configured to:

perform an arithmetic operation for an arithmetic operation task, output a result of the arithmetic operation, and receive an arithmetic operation task from the outside of the vehicle by using the communication function when an amount of arithmetic operations performed in the vehicular arithmetic operation processing device is equal to or less than a predetermined first value; and transmit an arithmetic operation task to the outside of the vehicle by using the communication function when the amount of arithmetic operations which are performed in the vehicular arithmetic operation processing device is equal to or greater than a predetermined second value.

2. The vehicular arithmetic operation processing device according to claim 1, wherein the electronic control unit is configured to receive an arithmetic operation task from the outside of the vehicle via an external server computer.

3. The vehicular arithmetic operation processing device according to claim 1, wherein the electronic control unit is configured to transmit an arithmetic operation task to the outside of the vehicle via an external server computer.

4. The vehicular arithmetic operation processing device according to claim 1, wherein the communication function of communicating with the outside of the vehicle includes a communication function of communicating with an arithmetic operation processing device of another vehicle located in a predetermined range.

5. The vehicular arithmetic operation processing device according to claim 4, wherein the electronic control unit is configured to transmit an arithmetic operation task to the vehicular arithmetic operation processing device of the other vehicle located in the predetermined range by using the communication function when the amount of arithmetic operation performed in the vehicular arithmetic operation processing device is equal to or greater than the predetermined second value.

6. The vehicular arithmetic operation processing device according to claim 1, wherein the predetermined first value and the predetermined second value are the same.

7. A non-transitory storage medium storing instructions that are executable by one or more processors which are mounted in a vehicle having a communication function of communicating with an outside of the vehicle, and the instructions that cause the one or more processors to perform functions comprising:

performing an arithmetic operation for an arithmetic operation task and outputting a result of the arithmetic operation; and receiving an arithmetic operation task from the outside of the vehicle when an amount of arithmetic operations performed by the one or more processors is equal to or less than a predetermined first value and transmitting an arithmetic operation task to the outside of the vehicle when the amount of arithmetic operations performed by the one or more processors is equal to or greater than a predetermined second value.

* * * * *